United States Patent [19]

Lee et al.

[11] Patent Number: 4,755,966
[45] Date of Patent: Jul. 5, 1988

[54] BIDIRECTIONAL BRANCH PREDICTION AND OPTIMIZATION

[75] Inventors: Ruby B. Lee, Cupertino; Allen J. Baum, Palo Alto, both of Calif.

[73] Assignee: Hewlett-Packard Company, Palo Alto, Calif.

[21] Appl. No.: 750,625

[22] Filed: Jun. 28, 1985

[51] Int. Cl.⁴ .............................................. G06F 9/00
[52] U.S. Cl. .................................................. 364/900
[58] Field of Search ............................. 364/200, 900

[56] References Cited

U.S. PATENT DOCUMENTS

| | | | |
|---|---|---|---|
| 3,766,527 | 10/1973 | Briley | 364/200 |
| 3,988,719 | 10/1976 | Whitby et al. | 364/200 |
| 4,325,120 | 4/1982 | Colley et al. | 364/200 |
| 4,378,589 | 3/1983 | Finnegan et al. | 364/200 |
| 4,390,946 | 6/1983 | Lane | 364/200 |
| 4,514,804 | 4/1985 | Kimoto | 364/200 |
| 4,539,635 | 9/1985 | Boddie et al. | 364/200 |

FOREIGN PATENT DOCUMENTS 2158833 9/1976 France.
2069733 2/1981 United Kingdom.

OTHER PUBLICATIONS

Smith, "A Study of Branch Prediction Strategies" The 8th Annual Symposium On Computer Architecture, IEEE, Computer Society Press, pp. 135-147, 12-14 May, 1981.
Dale, "Instruction Nullification By Saving and Restoring Architected Data" IBM Technical Disclosure Bulletin, Vol. 23, No. 11, p. 5271, Apr. 1981.
Radin, "The 801 Minicomputer," IBM J. Res. Develop. Vol. 27, No. 3, 5/83.
Patterson, "Reduced Instruction Set Computers" Communications of the ACM, Vol. 28, No. 1, 1/85.

Primary Examiner—Gareth D. Shaw
Assistant Examiner—John G. Mills, III
Attorney, Agent, or Firm—Bloor Redding, Jr.

[57] ABSTRACT

A method and apparatus for efficient branching within a central processing unit with overlapped fetch and execute cycles which optimizes the efficient fetching of instructions.

2 Claims, 3 Drawing Sheets

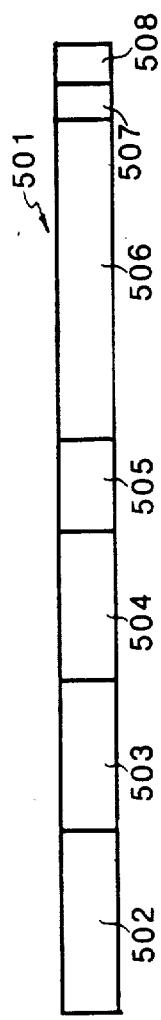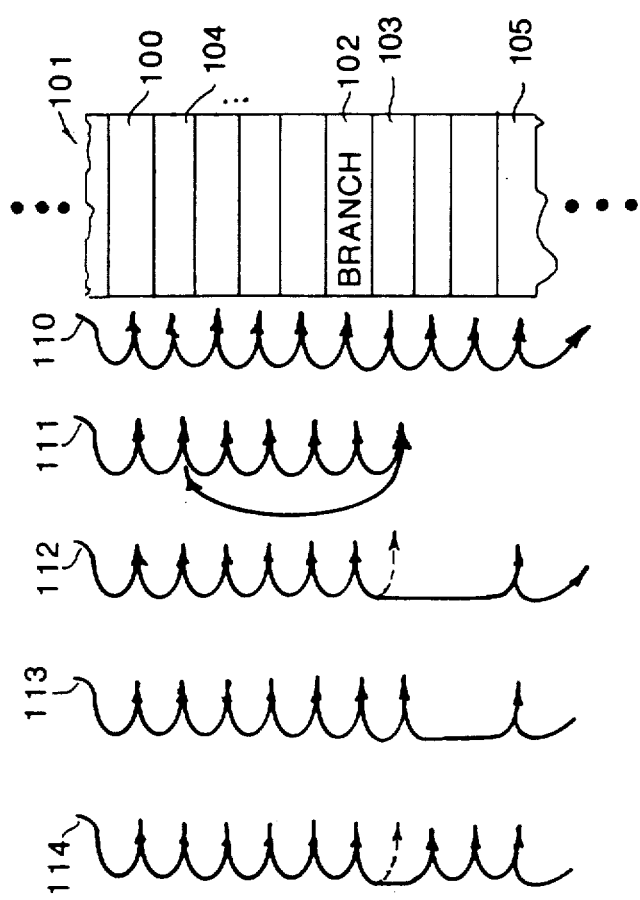

BIDIRECTIONAL BRANCH PREDICTION AND OPTIMIZATION

BACKGROUND

The ability to make decisions by conditional branching is an essential requirement for any computer system which performs useful work. The decision to branch or not to branch may be based on one or more events. These events, often referred to as conditions, include: positive, negative or zero numbers, overflow, underflow, or carry from the last arithmetic operation, even or odd parity, and many others. Conditional branches are performed in digital computers by conditional branch instructions. Conditional branch instructions may be used to construct such high level programming constructs as loops and if-then-else statements. Because the loops and if-then-else programming constructs are so common, it is essential that the conditional branch instructions which implement them excecute as efficiently as possible.

A computer instruction is executed by performing one or more steps. Typically, these steps are first to fetch the instruction pointed to by a program counter, second to decode and perform the operation indicated by the instruction and finally to save the results. A simple branch instruction changes the contents of the program counter in order to cause execution to "jump" to somewhere else in the program. In order to speed up the execution of computer instructions, a technique of executing more than one instruction at the same time, called pipelining, was developed. Pipelining permits, for example, the central processing unit, CPU, to fetch one instruction while executing another instruction and while saving the results of a third instruction at the same time. In pipelined computer architectures, branching is an expensive operation because branch instructions may cause other instructions in the pipeline to be held up pending the outcome of the branch instruction. When a conditional branch instruction is executed with the condition true, it causes the CPU to continue execution at a new address referred to as a target address. Since instruction fetching is going on simultaneously with instruction decoding and execution in a pipelined computer, the computer has already fetched the instruction following the branch instruction in the program. This is a different instruction than the instruction at the target address. Therefore, the CPU must hold up the instruction pipeline following the branch instruction until the outcome of the branch instruction is known and the proper instruction fetched. In order to maximize throughput of the computer, computer designers have attempted to design computers which maximize throughput by minimizing the need to hold up the instruction pipeline.

In the prior art, several schemes have been used to avoid holding up the instruction pipeline for conditional branches. First, some high performance processors have used various branch prediction schemes to guess whether the conditional branch will be taken or not. This approach requires extensive hardware and is unacceptable in all but the highest performance computers because of the expensive hardware required. Second, other architectures have fetched both the instruction in the program following the branch and the instruction at the branch target address. This approach is unacceptable because it also requires expensive hardware and additional memory accesses to always fetch both instructions. Third, some architectures have a bit in the instruction to tell the computer whether it is more probable for the instruction following the branch or the instruction at the branch target address to be executed. The computer then fetches the more probable instruction and holds up the pipeline only if the guess is wrong. This approach requires expensive hardware and if the guess is wrong causes additional time to be spent backing up the pipeline and fetching appropriate instruction. Fourth, other architectures allow two bits which instruct the CPU to always or never execute the instruction following the branch instruction based on whether the branch is taken or not taken. This architecture uses too many bits from the instruction thereby reducing the maximum range of the branch instruction. Finally, still other architectures always execute the instruction in the program following the branch instruction before taking or not taking the branch.

The technique of executing the instruction in the program following the branch instruction is known as delayed branching. Delayed branching is desirable since the instruction in the pipeline is always executed and the pipeline is not held up. This occurs because delayed branching gives the computer time to execute the branch instruction and compute the address of the next instruction while executing the instruction in the pipeline. Although this technique avoids holding up the instruction pipeline, it may require placing a no operation instruction following the branch instruction, which would not improve performance since the additional memory access negates any improvement.

One software technique which takes advantage of delayed branching is merger. The concept of merger described here is where the loop branch instruction is at the end of the loop. Merger takes advantage of delayed branching by duplicating the first instruction of the loop following the loop's branch instruction and making the branch target address the second instruction of the loop. One potential problem with merger is that on exit from the loop, the program does not necessarily want to execute the merged instruction following the branch instruction again. This is a problem for architectures which always use delayed branching.

When many prior art computer systems determine that a branch is about to be executed, the computer systems hold up, or interlock, the instruction pipeline. Interlocking the pipeline involves stopping the computer from fetching the next instruction and preventing the pipeline from advancing the execution of any of the instructions in the pipeline. Interlocking reduces the performance increase gained by pipelining and therefore is to be avoided.

What is needed is a method of conditional branching which minimizes the amount of hardware and performance reductions. The method should take as few bits of the instruction as possible since each bit taken effectively halves the maximum range of the branch instruction.

SUMMARY

In accordance with the preferred embodiment of the present invention, a method and apparatus are provided for conditional branching within a digital computer. The preferred embodiment of the present invention provides a branch instruction which statically predicts whether the branch will be taken or not taken based on the branch displacement. The method uses delayed branching where possible but also provides for nullification of the delay slot instruction following the branch instruction where the delay slot instruction cannot be used efficiently.

The present invention is superior to the prior art in several ways. First, the preferred embodiment of the present invention is capable of a branch frequently/branch rarely prediction for conditional branch instructions based on the existing sign bit of the branch displacement without requiring any other bit in the instruction. Second, the preferred embodiment of the present invention optimizes the use of the instruction immediately following the conditional branch which reduces the probability of holding up the instruction pipeline and its resulting reduction in performance. Third, the preferred embodiment of the present invention nullifies the instruction following the branch only in cases then the instruction cannot be used. Finally, the preferred embodiment of the present invention provides a more flexible and efficient nullification scheme based on direction of branching rather than always executing or never executing the instruction following the branch.

DESCRIPTION OF DRAWINGS

FIG. 1 is a branch instruction in accordance with the preferred embodiment of the present invention.

FIG. 2 illustrates a method of branching in accordance with the preferred embodiment of the present invention.

DESCRIPTION OF THE PREFERRED EMBODIMENT

Figure 3:
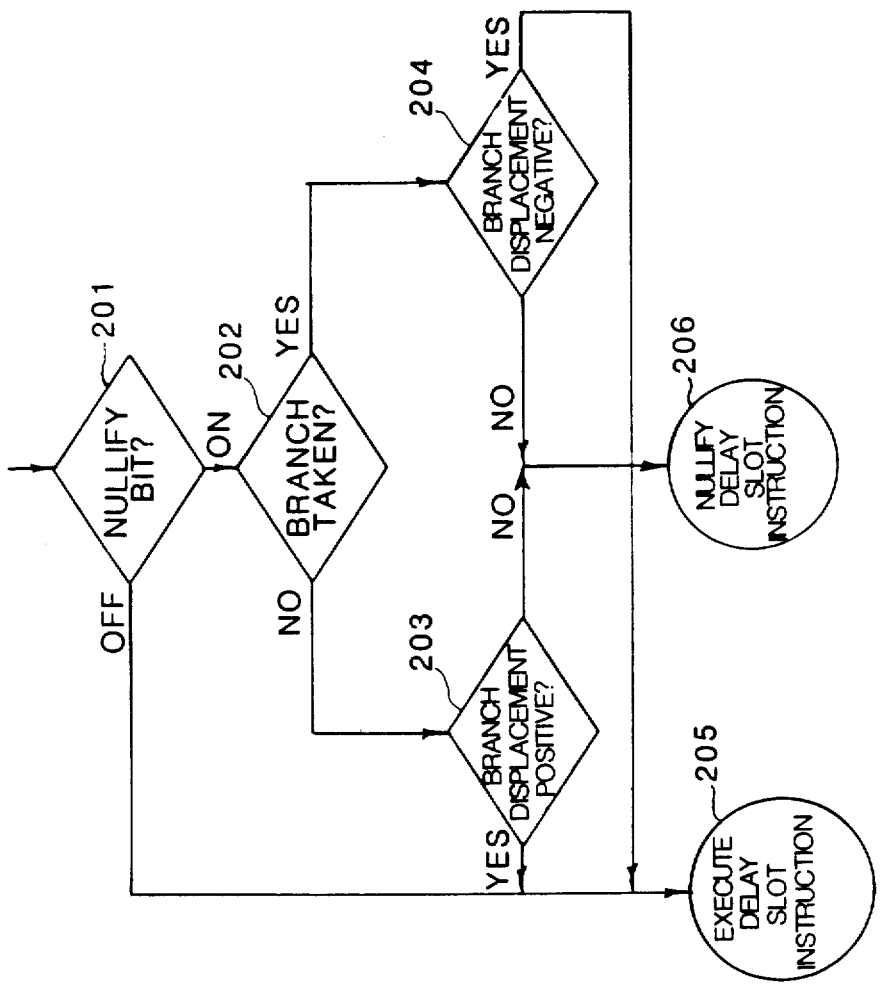
FIG. 3 is a flow chart of the method of branching.

FIG. 1 is a branch instruction in accordance with the preferred embodiment of the present invention. The branch instruction 501 consists of 32 bits of information used by the computer to execute the instruction. This instruction combines the function of branching with the operation of comparing two operands, although the present invention could be implemented by a branch only instruction as well. The instruction 501 contains a six bit operation code field 502, a five bit source register address field 503, a five bit second source register address field 504, a three bit condition code field 505, a eleven bit branch displacement field 506 and one bit displacement field sign bit 508, and a nullify bit 507. The operation code field 502 identifies this instruction as a compare and branch instruction. The first and second source register address fields 503 and 504 identify the registers whose contents will be compared. The branch displacement, which may be positive or negative, is determined by fields 508 and 506. This displacement is used to calculate the target address for the branch. The next instruction in the instruction pipeline may be nullified according to the preferred embodiment of the present invention by setting the nullify bit 507.

In the preferred embodiment of the present invention, the execution of the current instruction may be nullified. The purpose of nullification is to make the instruction appear as if it never existed in the pipeline even though the instruction may have been fetched and its operation performed. Nullification is accomplished by preventing that instruction from changing any state of the CPU. To prevent changing the state of the computer, the nullification process must prevent the writing of any results of the nullified instruction to any registers or memory location and prevent any side effects from occurring, for example, the generation of interrupts caused by the nullified instruction. This is performed in the preferred embodiment by qualifying any write signals with the nullify signal generated in the previous instruction thus preventing the instruction from storing any results of any calculation or otherwise changing the state of the computer system. A simple way of qualifying the write signals of the current instruction is by 'AND'ing the write signals with a retained copy of the nullify signal generated in the previous instruction. The nullify signal generated by an instruction may, for example, be saved in the processor status word for use in the following instruction. Nullification is a very useful technique because it permits an instruction to be fetched into the pipeline without concern as to whether a decision being made by another instruction in the pipeline may cause this instruction not to be executed. The instruction simply progresses through the pipeline until it comes time to store its results and the instruction may then be nullified at the last minute with the same effect as if the instruction never existed in the pipeline.

In a pipelined computer system there are two distinct concepts as to the next instruction to be executed. The first concept is a time sequential instruction, which is the next instruction in the instruction pipeline after the current instruction. This instruction will be executed after the current instruction and the results of the operation stored unless nullified. The second concept is a space sequential instruction. This is the instruction immediately following the current instruction in the program. Generally, the space sequential instruction for the current instruction will be the time sequential instruction. The execption to the rule occurs with taken branch instructions, where the time sequential instruction is the instruction at the target address which is generally not the space sequential instruction of the branch instruction.

The delay slot instruction is the time sequential instruction of a branch instruction. Generally, the delay slot instruction will be the space sequential instruction of the branch instruction. The exception to this rule is the case of a branch following a branch instruction. For this case, the delay slot instruction for the second branch instruction will be the target address of the first branch instruction rather than the space sequential instruction of the second branch instruction.

Unconditional branching in the preferred embodiment of the present invention clearly illustrates the concept of nullification and the delay slot instruction. With the nullify bit off, the delay slot instruction of the unconditional branch instruction is always executed. With the nullify bit off, the delay slot instruction of the unconditional branch instruction is always nullified. This is equivalent to never executing the delay slot instruction.

FIG. 2 illustrates a method of conditional branching in accordance with preferred embodiment of the present invention. A computer practicing the method of FIG. 2 has a program 101 consisting of instructions 100 including a conditional branch instruction 102. The space sequential instruction to the branch instruction 102 is instruction 103. For a conditional branch instruction 102 with negative branch displacement, instruction 104 is at the target address. For a conditional branch instruction 102 with a positive branch displacement, instruction 105 is at the target address. The execution of the program is illustrated by graphs 110, 111, 112, 113, and 114. During normal execution, the program executes the current instruction and then executes the space sequential instruction to the current instruction.

Graphs 110, 111 and 113 illustrate the operation of a branch instruction with the nullify bit off. This corresponds to the 'never nullify' or 'always execute' case. The delay slot instruction following the branch instruction is always executed regardless of whether the branch if taken or not and whether it has a positive or negative displacement. When the branch condition is false, execution continues with the space sequential instruction 103 as shown in graph 110. When the branch condition is true, the delay slot instruction is executed and then the instruction at the target address is executed as shown in graph 111 for a negative displacement branch and in graph 113 for a positive displacement branch.

Graph 110, 111, 112 and 114 illustrate the operation of a branch instruction with the nullify bit on. This corresponds to the 'sometimes nullify' case as described below. With the nullify bit on, the delay slot instruction may be nullified depending on the direction of the branch and whether the condition determining whether the branch is taken or not is true or false. Graphs 110 and 114 illustrate the operation of the branch instruction when the condition triggering the branch is false causing the branch not to be taken. If the branch displacement is positive, the delay slot instruction is executed as shown by graph 110. If the branch displacement is negative, the delay slot instruction is nullified as shown by graph 114. The dotted line on graphs 112 and 114 indicate that the delay slot instruction, although fetched, will be nullified as it if never existed in the instruction pipeline.

Graphs 111 and 112 illustrate the operation of the branch instruction with the nullify bit on when the condition triggering the branch is true causing the branch to be taken. If the branch displacement is positive, the delay slot instruction is nullified as shown in graph 112 and execution continues at the target address. If the branch displacement is negative, the delay slot instruction is executed as shown in graph 111 before continuing at the target address.

FIG. 3 is a flow chart of the method of branching. The graphs 111 through 114 may be more clearly understood by referring to the flow chart. The first step is to determine whether the nullify bit is on. If the nullify bit is off, then the delay slot instruction for the branch instruction is always executed. This occurs whether or not the branch is taken. If the nullify bit is on, then the delay slot instruction following the branch is not executed unless the branch is taken and the branch displacement is negative, or unless the branch is not taken and the branch displacement is positive.

The operation of the preferred embodiment of the present invention embodies a very simple but effective method of static branch prediction which predicts whether the branch will be taken or not, and therefore which instruction to fetch, based on whether positive or negative displacement branches are taken. Its effectiveness depends on computer software following a set of software conventions in implementing certain higher level program control constructs by means of a conditional branch instruction. For example, a loop construct is implemented by a backward conditional branch, so that a branch instruction with a negative displacement will be taken frequently. In fact, it will be taken N−1 out of N times for a loop that is executed N times. Another example of the softward conventions assumed is that an if-then-else construct is implemented by a forward branch to the rarely taken part, allowing the more frequently executed part to lie immediately following the branch instruction in the not taken branch path. For example, the forward branch may be to an error handling routine which rarely gets executed in a normal program. In addition, the preferred embodiment of the present invention having a nullify bit generalizes and optimizes the use of the delay slot instruction in conjunction with the static branch prediction technique described above. With the nullify bit on, a backward conditional branch that is taken or a forward conditional branch that is not taken, being the tasks that are predicted to be frequent by the static branch prediction technique, cause the delay slot instruction to be executed. Hence, some useful instruction in the frequent path may be executed as the delay slot instruction, for example, as described in the merger technique above. With the nullify bit on, a backward conditional branch that is not taken or a forward conditional branch that is taken, being the tasks that are predicted to be rare, cause the delay slot instruction to be nullified. Hence, nullification which reduces performance occurs only in the rare case.

With the nullify bit off, the delay slot instruction is always executed. This corresponds to the case where an instruction common to both the branch taken and the branch not taken paths can be designated as the delay slot instruction.

Figure 4:
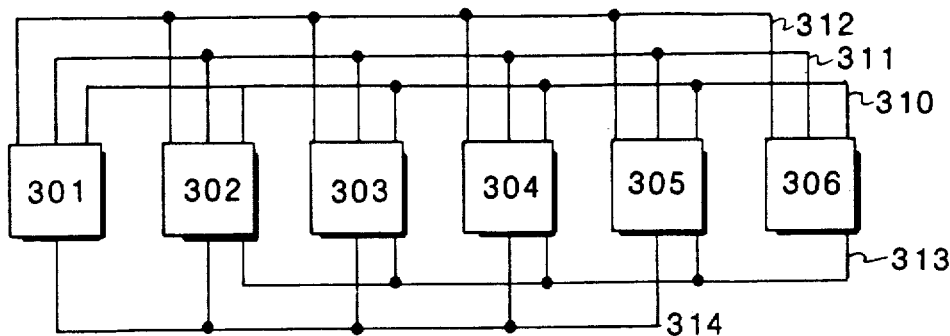
FIG. 4 is a functional block diagram of an apparatus in accordance with the preferred embodiment of the present invention.

FIG. 4 is a functional block diagram of an apparatus in accordance with the preferred embodiment of the present invention. The apparatus contains six functional elements: an instruction memory 301, an optional virtual address translation unit 302, an instruction unit 303, an execution unit 304, an optional floating point unit 305 and an optional register file 306. These functional elements are connected together through five busses: a result bus 310, a first operand bus 311, a next instruction bus 312, a second operand bus 313 and an address bus 314. Only the execution unit 304 and the instruction unit 303 are involved in performing the operation of the preferred embodiment of the present invention. The execution unit generates and/or stores the conditions on which the decision to branch or not to branch is made. The instruction unit performs the branch by generating the address of the next instruction to be fetched from the memory and provides means for storing the address into the program counter. In the preferred embodiment of the present invention, the memory unit is a high speed cache with speed on the order of the logic used in the execution unit.

Figure 5:
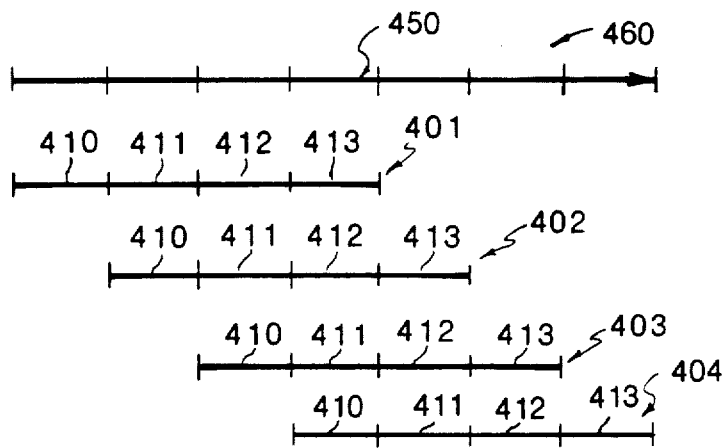
FIG. 5 is a timing state diagram of the apparatus in FIG. 4.

FIG. 5 is a timing state diagram of the apparatus in FIG. 4. The timing diagram illustrates four stages involved in the execution of instructions 401, 402, 403 and 404. Time line 460 is divided into stages with the time progressing to the right. The four timing stages for each instruction are: an instruction address generation stage 410, an instruction fetch stage 411, an execute stage 412, and a write stage 413. The execution of instructions may be pipelined to any depth desired. The preferred embodiment of the present invention contains a four stage pipeline. As shown in FIG. 5, four instructions are being executed at any one time. At time 450, the write stage of instruction 401 is overlapped with the execution stage of instruction 402, the instruction fetch stage of instruction 403 and the instruction address generation stage of instruction 404. This means for a branch instruction that next instruction will have been fetched while the branch instruction is in the execution stage. During the instruction address generation stage, the address of the next instruction is calculated from the program counter which contains the address of the next instruction to be executed and is located in the instruction unit 303. During the instruction fetch stage, the next instruction is fetched from the instruction memory 301. This is performed by applying the contents of the address calculated in the instruction address generation stage onto the address bus 314 and transferring the contents of that address to the next instruction bus 312 where it is decoded by the instruction unit. The branch instruction may be combined with other operations, for example, a compare operation, which would be also decoded and performed at this time in the execution unit 304.

In the execute stage 412, the branch instruction is performed. During the execute phase 412 both the target address of the branch instruction and the address of the space sequential instruction to the branch instruction are generated. At this time if the instruction is combined with another operation, that operation is performed. At the end of the execution phase, one of the two addresses is transferred into the program counter. Which address to transfer to the program counter is determined by the condition generated or stored in the execution unit 304. During the write phase 413, no operation occurs unless a result from a combined instruction needs to be stored. By performing all writing of any results to memory or registers and any side effects like interrupt acknowledgement caused by an instruction no earlier than stage 412 and 413, this approach enables a simpler implementation of the concept of nullifying an instruction which is always in the pipeline.

We claim:

1. A method for controlling the execution of a program in a pipe line computer to maximize the use of a delay slot instruction and branch instruction, the program containing a conditional branch instruction, a first instruction, a second instruction (delay slot instruction) and a third instruction, the control being performed by executing the conditional branch instruction thereby controlling how normal sequential execution of instructions is restarted, the conditional branch instruction containing a predetermined condition and a displacement, said condition having true and false states, said displacement having positive and negative values where positive values are in the direction of normal sequential execution, the first instruction being located at said displacement from the branch instruction, in the program, the second instruction being the time sequential instruction to the branch instruction in the program the third instruction being the space sequential instruction of the second instruction in the program, the method comprising:

determining the value of the displacement;
determining the state of the predetermined condition;
executing the second instruction (delay slot instruction) if the predetermined condition is true and the displacement is a negative value;
executing the second instruction (delay slot instruction) if the predetermined condition is false and the displacement is a positive value; and
continuing normal sequential execution of the program with the first instruction if the predetermined condition is true and with the instruction if the condition is false, so that the usability of the delay slot instruction is maximized by conditioning its execution on the state of the predetermined condition and direction of the displacement of the branch instruction.

2. A method as in claim 6 for controlling the execution of a branch instruction containing in addition a nullify signal which true and false state comprising the steps of:

determining the state of the nullify signal; and
executing the second instruction (delay slot instruction) if the nullify signal is false.

* * * * *

UNITED STATES PATENT AND TRADEMARK OFFICE
CERTIFICATE OF CORRECTION

PATENT NO. : 4,755,966

DATED : July 5, 1988

INVENTOR(S) : Ruby B. Lee and Allen J. Baum

It is certified that error appears in the above-identified patent and that said Letters Patent is hereby corrected as shown below:

Col. 8, Line 35,     "claim 6" should read --claim 1--

Signed and Sealed this

Twenty-seventh Day of June, 1989

Attest:

DONALD J. QUIGG

Attesting Officer

Commissioner of Patents and Trademarks